(12) United States Patent
Hulicsko

(10) Patent No.: US 7,819,202 B2
(45) Date of Patent: Oct. 26, 2010

(54) IMPLEMENT WITH REAR FOLDING TRANSPORT

(76) Inventor: Les Hulicsko, 1891 Albert Street North, Box 37120, Regina, SK (CA) B4S 7K3

( * ) Notice: Subject to any disclaimer, the term of this patent is extended or adjusted under 35 U.S.C. 154(b) by 0 days.

(21) Appl. No.: 12/179,955

(22) Filed: Jul. 25, 2008

(65) Prior Publication Data
US 2010/0018729 A1    Jan. 28, 2010

(51) Int. Cl.
*A01B 49/00* (2006.01)

(52) U.S. Cl. .................................. 172/311; 172/452

(58) Field of Classification Search .............. 172/310, 172/311, 321, 452
See application file for complete search history.

(56) References Cited

U.S. PATENT DOCUMENTS

| | | | | |
|---|---|---|---|---|
| 18,360 | A * | 10/1857 | Squier | 111/53 |
| 1,776,860 | A * | 9/1930 | Krause | 172/311 |
| 3,162,459 | A * | 12/1964 | Lawson et al. | 280/656 |
| 3,353,611 | A * | 11/1967 | Byrd | 172/240 |
| 3,548,954 | A * | 12/1970 | Lindemann | 172/311 |
| 4,042,044 | A * | 8/1977 | Honnold | 172/311 |
| 4,042,045 | A * | 8/1977 | Hake | 172/311 |
| 4,117,892 | A * | 10/1978 | Dietrich et al. | 172/311 |
| 4,117,893 | A * | 10/1978 | Kinzenbaw | 172/311 |
| 4,126,187 | A * | 11/1978 | Schreiner et al. | 172/311 |
| 4,338,872 | A * | 7/1982 | Decker | 111/56 |
| 4,496,004 | A * | 1/1985 | Frase et al. | 172/311 |
| 4,660,651 | A * | 4/1987 | Pfenninger et al. | 172/311 |
| 4,709,857 | A * | 12/1987 | Wilger | 239/164 |
| 4,739,930 | A * | 4/1988 | Pask | 239/161 |
| 5,029,757 | A * | 7/1991 | Bourgault et al. | 239/167 |
| 5,251,704 | A * | 10/1993 | Bourgault et al. | 172/311 |
| 5,660,237 | A * | 8/1997 | Boyko et al. | 172/311 |
| 5,829,370 | A * | 11/1998 | Bender | 111/54 |
| 6,719,213 | B1 * | 4/2004 | Ferguson | 239/166 |
| 7,040,552 | B2 * | 5/2006 | McCrea et al. | 239/167 |
| 7,377,453 | B2 * | 5/2008 | Auer et al. | 239/168 |

\* cited by examiner

*Primary Examiner*—Robert E Pezzuto
*Assistant Examiner*—Jamie L McGowan
(74) *Attorney, Agent, or Firm*—Patterson, Thuente, Christensen, Pedersen, P.A.

(57) ABSTRACT

An agricultural implement apparatus includes a center section and wings pivotally attached to ends of the center section. Wing wheels are pivotally mounted to the wings about vertical axes. The wings can pivot from a transport position, where the wings extend rearward in alignment with the travel direction and where a rotational plane of each wing wheel is aligned with the corresponding wing, to a field position where the wings extend perpendicular from the center section and where the rotational plane of each wing wheel is perpendicular to the wing. Right and left wheel actuators pivot the wing wheels from the transport position to the field position as the apparatus moves in the operating travel direction by pivoting the right wing wheel such that a front edge thereof moves to the right, and by pivoting the left wing wheel such that a front edge there moves to the left.

8 Claims, 2 Drawing Sheets

IMPLEMENT WITH REAR FOLDING TRANSPORT

This invention is in the field of towed implements with significant width such as agriculture seeders, sprayers, rollers, and the like, and in particular a transport mechanism for such implements where wings of the implements are folded rearward for transport.

BACKGROUND

In some types of wider implements, it is known to fold the wings of the implement from a field position, where right and left wings are extended substantially perpendicular to the operating travel direction, rearward and backward to a transport position where the wings are substantially parallel and aligned in the travel direction. Such an implement is disclosed for example in U.S. Pat. No. 4,821,809 to Summach et al. which discloses a rear folding drawbar such as would be used for carrying harrows, packers, and the like. Rear fold transport is relatively inexpensive compared to transport systems where the wings are folded upward.

Rear fold is therefore popular with relatively lighter implements such as harrows, sprayers, packers, and the like which are relatively easy to pull, and typically are very wide. Rear fold is also popular for land rollers which typically comprise large and heavy cylindrical drums mounted to the center section and to each wing for rolling land to smooth the surface and push rocks and the like into the ground to facilitate harvesting short crops.

A typical implement will have a center section mounted on fixed wheels, with the right and left wings pivotally attached to corresponding right and left ends of the center section about a vertical axis. Wheels supporting the outside ends of the wings are typically castering wheels free to pivot about a vertical caster axis so as to roll along the ground in any direction as dictated by the position of the wing. In the field position the wings are typically maintained perpendicular to the operating travel direction by a cable, bar, or like brace extending forward and inward from a middle portion of the wing to the center section.

When moving from the field position to the transport position, the braces are released and as the towing vehicle moves the center section forward, the wings fall back into alignment with the operating travel direction and the wheels caster into alignment with the operating travel direction. With implements where the wings are light, such as agricultural sprayers, often the operator or manually moves the wings out from the transport position to the field position and attaches the braces. However where the wings are heavier, such as with harrows, packers, land rollers, and the like, moving from the transport position to the field position requires maneuvering the wings by turning to one side, backing up, or the like such that one of the wings extends laterally from the center section so that the brace can be attached, and then turning the opposite way or backing up to similarly orient the other wing and attach the brace for it.

It is also known to provide a mechanism for pulling the wings forward, such as that disclosed in U.S. Pat. No. 4,709,857 to Wilger directed to transport system for a sprayer. In the Wilger sprayer the wing wheels are controlled by a hydraulic cylinder that moves them 90 degrees with respect to the wing. In the transport position the wheels are aligned parallel with the wing. To move from transport to field position the implement is stopped in the field, and the wing wheels are moved 90 degrees such that the wheels are perpendicular to the wing. A power fold arm then pulls the wings outward and forward to the field position where the wheels are aligned with the operating travel direction in the field position, and braces are latched to maintain the wings in the field position. The implement may then be moved forward.

Rear folding agricultural sprayers with their light weight wings present relatively minor challenges compared to the much heavier implements used for seeding and ground working where the wings are relatively massive and heavy. U.S. Pat. No. 6,374,921 to Friggstad discloses an air seeder where the wings fold forward instead of rearward.

It is becoming more common to pull a chain of implements and carts behind one tow vehicle. For example in an air seeder there may be a cart carrying agricultural products at the front, then the air seeding implement hooked to the cart, then a fertilizer wagon hooked to the air seeder, then perhaps a packer hooked behind the fertilizer wagon. It is not practically possible to maneuver a conventional rear fold implement from the transport to field position as described above because it is almost impossible to back up a chain of two or three implements. The system of Wilger, when adapted to a heavy implement such as an air seeder or a land roller, requires a costly and cumbersome mechanism that is able to exert very high forces on the wings in order to draw them forward from transport to field position.

SUMMARY OF THE INVENTION

It is an object of the present invention to provide an apparatus and method for transporting an implement into a transport position and back into the field position that overcomes problems in the prior art.

In a first embodiment the invention provides an agricultural implement apparatus comprising a center section mounted on main wheels oriented to carry the center section in a forward operating travel direction. Right and left wings are pivotally attached to corresponding right and left ends of the center section about substantially vertical wing pivot axes, and right and left wing wheels are mounted at outer locations on the corresponding right and left wings operative to support the wings for travel in the operating travel direction. The wing wheels are pivotally mounted to the wings about substantially vertical right and left wheel axes. The wings can pivot from a transport position, where the wings extend rearward from ends of the center section and are oriented substantially in alignment with the operating travel direction and where a rotational plane of each wing wheel is substantially aligned with the corresponding wing section and with the operating travel direction, to a field position where the wings extend substantially perpendicular from ends of the center section and where the rotational plane of each wing wheel is substantially perpendicular to the wing and aligned with the operating travel direction. A right wheel actuator is operative to pivot the right wing wheel from the transport position to the field position as the apparatus moves in the operating travel direction by pivoting the right wheel about the right wheel axis such that a front edge of the right wheel moves to the right, and a left wheel actuator is operative to pivot the left wing wheel from the transport position to the field position as the apparatus moves in the operating travel direction by pivoting the left wheel about the left wheel axis such that a front edge of the left wheel moves to the left.

In a second embodiment the invention provides a method of operating an agricultural implement. The method comprises providing an agricultural implement including a center section mounted on main wheels oriented to carry the center section in a forward operating travel direction, right and left wings pivotally attached to corresponding right and left ends of the center section about substantially vertical wing pivot axes, right and left wing wheels mounted at outer locations on the corresponding right and left wings operative to support the wings for travel in the operating travel direction wherein the wing wheels are pivotally mounted to the wings about substantially vertical right and left wheel axes and right and left wheel actuators operative to pivot the right and left wing wheels about their respective wheel axes; orienting the wings in a transport position where the wings extend rearward from ends of the center section and are oriented substantially in alignment with the operating travel direction, and where a rotational plane of each wing wheel is substantially aligned with the corresponding wing section and with the operating travel direction; with a vehicle connected to the center section, moving the implement to a field location; moving the implement in the operating travel direction while operating the right wheel actuator to move a front edge of the right wing wheel to the right and operating the left wheel actuator to move a front edge of the left wing wheel to the left such that the wings move outward to an intermediate position where the wings extend laterally from ends of the center section; operating the right wheel actuator to move a front edge of the right wing wheel to the right and operating the left wheel actuator to move a front edge of the left wing wheel to the left such that rotational planes of the right and left wheels are substantially perpendicular to the corresponding right and left wings; exerting a final force on the wings relative to the center section to move the wings to a field position where the wings extend substantially perpendicular from ends of the center section and where the rotational plane of each wing wheel is substantially aligned with the operating travel direction; and securing the wings in the field position.

In the transport position, the longitudinal axes of the wings are oriented in alignment with the operating travel direction extending rearward, and the rotational plane of each wing wheel is aligned with the corresponding wing and with the operating travel direction. When a field location is reached, the actuators are activated to pivot front edges of the wing wheels outward, such that the front edge of the right wing wheel moves to the right and the front edge of the left wing wheel moves to the left. The implement is moved forward as the wing wheels pivot, and the wings are thus steered outward toward the field position. Depending on the conditions and the implement, the wings will move out through about 65 to 80 degrees to extend laterally from ends of the center section by simply steering the wing wheels.

When this orientation has been achieved, only a relatively small final force urging the wings forward relative to the center section is required to be exerted to complete the movement of the wings to a field position perpendicular to the operating travel direction.

To exert this final force, the implement can be stopped and moved a small distance rearward to move the center section rearward relative to the wings, and thus urge the wings forward relative to the center section, and thereby finish moving the wings to the field position perpendicular to the operating travel direction. Braces or like fasteners can then be attached to maintain the wings in this full field position. Alternatively, depending on the type of implement, the field conditions, and like factors, the wings may have sufficient momentum that when forward movement of the center section is stopped, as by applying brakes of the towing tractor, momentum of the wings exerts the final force urging the wings forward relative to the stopped center section such that the wings continue moving forward to the fill field position where they may be fastened.

Further in the alternative it may be desirable to provide wing actuators that can be activated to exert the final force pull the wings forward through the final 10 to 20 degrees to the field position where the wings are perpendicular to the operating travel direction.

With the wings substantially extended laterally, only a small final force is required to complete the movement of the wings to the field position. Momentum of the wings can provide this force when the tractor is stopped. Inertia of the wings can provide this force when the tractor is moved in reverse after the forward motion is stopped. A wing actuator of quite moderate size can also provide the required force.

The wing actuator is required to provide substantially less force than would be the case where the wing actuators are required to initiate the movement of the wings from the rearward aligned transport position. The wing actuator typically will comprise a member or like brace attached to a mid point of the wing, and a hydraulic cylinder operative to exert a force on the brace to move the wings forward. With such a configuration, and with the wings partially extended, the force exerted by the wing actuator is exerted on a significant lever arm with respect to the wing pivot axis, such that the force to pivot the wing about the wing axis is further reduced. In addition the wing actuator could be operated while the implement is moving forward such that the wing is already moving forward along the ground, and so less force is required than would be required to start the wing from a stopped position.

By steering the wing wheels while moving forward, the wings move outward and forward toward the field position on their own, without the need to provide a mechanism with sufficient power to force the wings forward. Thus the apparatus and method allows for transporting an implement where the rear folding wings have considerable size and mass without providing a costly and cumbersome mechanism for moving the wings from transport to field position.

To move from the field to transport position, the braces are released and the implement is moved forward while pivoting the wheels back to their transport position with the rotational planes thereof aligned with the wings and the operating travel direction, Since the implement is moved forward during the transition from transport to field positions, and also during the transition from field to transport position, it can be located in a chain of implement where operating in a reverse direction would be problematic. A short movement in reverse as described above will also not be problematic in many applications, but if problematic this reverse movement can be avoided by applying the required as also described above.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
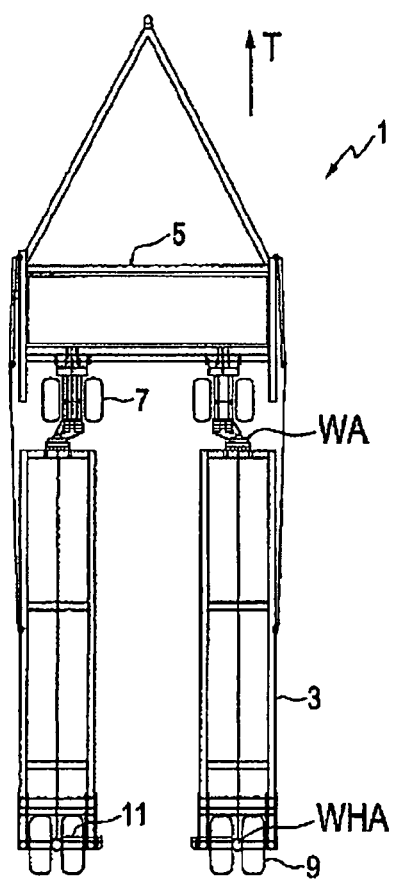
FIG. 1 is a schematic top view of an embodiment of an implement apparatus of the present invention in the transport position.

FIGS. 1-4 schematically illustrate the method of the invention for transporting an implement apparatus 1. The implement wing sections 3 are schematically shown in transport position in FIG. 1 and in the full field position in FIG. 4. The implement is not illustrated in detail, and could be any kind of agricultural implement such as a sprayer or harrow drawbar, and the method is particularly suited to heavier implements such as air seeders and land rollers. The illustrated implement apparatus 1 is adapted to be towed in an operating travel direction T by a tractor or the like, or could alternately be mounted directly on a vehicle.

The implement apparatus 1 comprises a center section 5 mounted on main wheels 7 oriented to carry the center section 5 in an operating travel direction T. The center section may be mounted directly on a vehicle which provides the main wheels, or towed by the vehicle, typically a tractor. Right and left wing sections 3 are pivotally attached to corresponding right and left ends of the center section 5 about substantially vertical wing pivot axes WA, and right and left wing wheels 9 are mounted at outer locations on the corresponding right and left wings 3 to support the wings 3 for travel in the operating travel direction T. The wing wheels 9 are pivotally mounted to the wings 3 about substantially vertical right and left wheel axes WHA and right and left wheel actuators 11 are operative to pivot the right and left wing wheels 9 about their wheel axes WHA.

Figure 2:
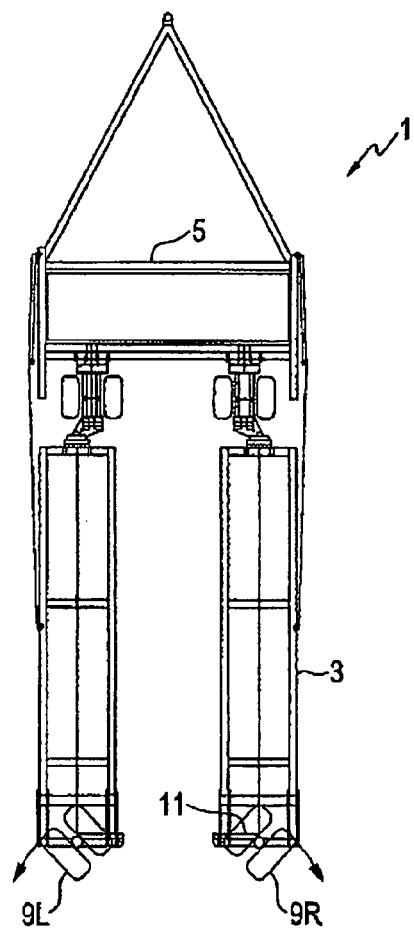
FIG. 2 is a schematic top view of the embodiment of FIG. 1 with the wheels partially turned toward the field position.

In the transport position, illustrated in FIG. 1, the wings 3 are oriented in alignment with the forward operating travel direction T and extending rearward. The rotational plane of each wing wheel 9 is aligned with the corresponding wing 3 and with the operating travel direction T. When a field location is reached, the actuators 11 are activated to pivot front edges of the wing wheels 9 outward, such that the front edge of the right wing wheel 9R moves to the right and the front edge of the left wing wheel 9L moves to the left, as illustrated in FIG. 2. FIG. 2 illustrates a method of the invention where the apparatus 1 is stopped in the field and then the wheels 9 are moved to the position of FIG. 2 before the implement is moved forward. Optionally the actuators 11 can be activated while the apparatus 1 is moving forward. In that method, the wings 3 will immediately begin to move outward and forward toward the field position from the transport position.

In either method, the apparatus 1 is moved forward as the wing wheels 9 pivot, and the wings 3 are thus steered outward toward the field position. Depending on the conditions and the implement, the wings 3 will typically move out through about 65 to 80 degrees to the intermediate position illustrated in FIG. 3 by simply steering the wing wheels 9 without exerting any other force on the wings 3.

Figure 3:
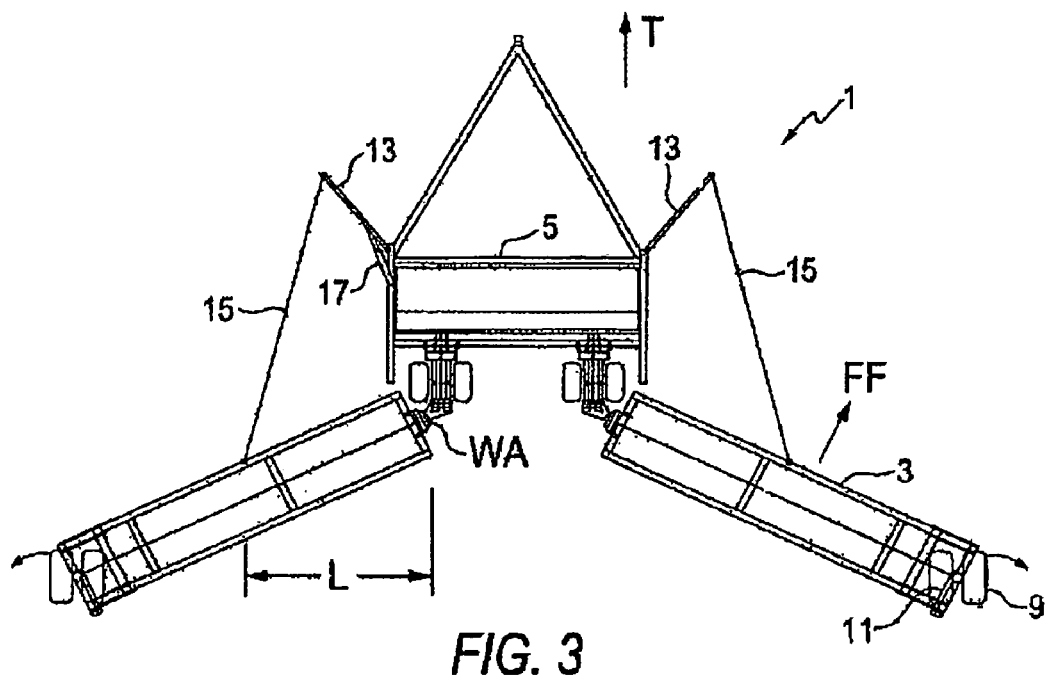
FIG. 3 is a schematic top view of the embodiment of FIG. 1 with the wings partially extended toward the field position.
Figure 4:
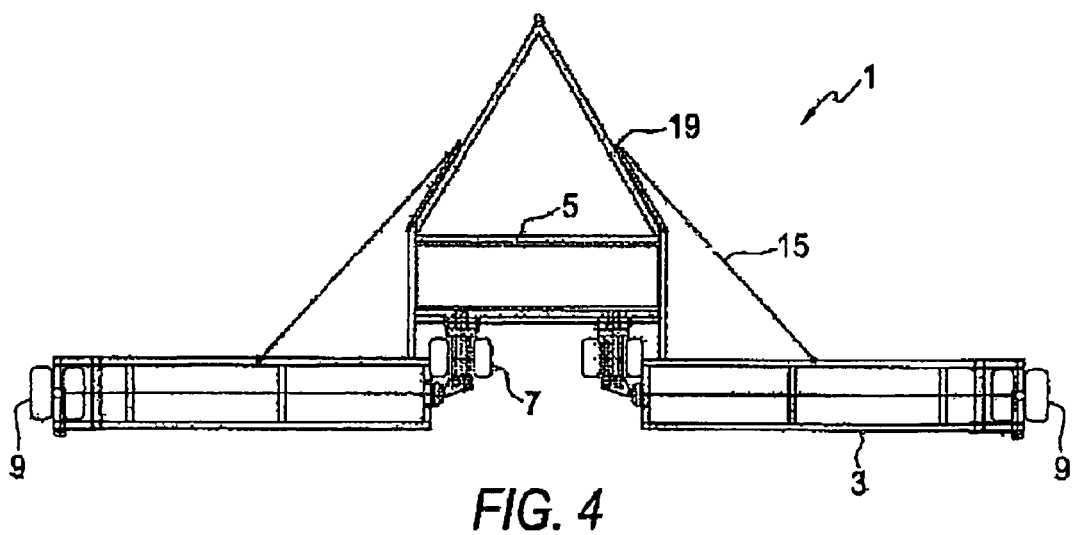
FIG. 4 is a schematic top view of the embodiment of FIG. 1 with the wings fully extended in the field position.

In a typical operation at this point the operator will ensure that the wheel actuators 11 pivot the wing wheels 9 outward from the position of FIG. 3 to the field position of FIG. 4 where the rotational planes of the wheels 9 are oriented perpendicular to the wings 3. This position will facilitate the final forward movement of the wings 3 with respect to the center section 5.

When this orientation has been achieved, only a relatively small final force FF urging the wings 3 forward relative to the center section 5 is required to be exerted to complete the movement of the wings 3 to a field position perpendicular to the operating travel direction as illustrated in FIG. 4.

To exert this final force FF, the implement can be stopped and moved a small distance rearward to move the center section 5 rearward relative to the wings 3, and thus urge the wings 3 forward relative to the center section 5, and thereby finish moving the wings 3 to the field position perpendicular to the operating travel direction as illustrated in FIG. 4. Bracing members 15 or like fasteners can then be attached to maintain the wings in this full field position. Alternatively, depending on the type of implement, the field conditions, and like factors, the wings 3 may have sufficient momentum that when forward movement of the center section 5 is stopped, as by applying brakes of the towing tractor, momentum of the wings 3 exerts the final force FF urging the wings 3 forward relative to the stopped center section 5 such that the wings 3 continue moving forward to the full field position where they may be fastened.

Further in the alternative it may be desirable to provide wing actuators 17, schematically illustrated in FIG. 3, that can be activated to pull the wings 3 forward through the final 10 to 20 degrees to the fill field position of FIG. 4 where the wings 3 are perpendicular to the operating travel direction T.

With the wings 3 substantially extended as in FIG. 3 before any force is required by the wing actuators 17 to complete the movement to field position, substantially less force is required than would be the case where the wing actuators 17 are required to initiate the movement of the wings 3 from the rearward aligned transport position.

The wing actuator 17 schematically illustrated in FIG. 4 is provided by a hydraulic cylinder connected to exert a force on the bracing member 15 to pull the wing forward. FIG. 4 illustrates a wing actuator on the left side of the apparatus 1 only, while on both side a bracing member 15 is connected to a pivot bar 13.

The bracing member 15 and pivot bar 13 are rigid and pivotally connected so that as the wings 3 move forward from the position of FIG. 1 to that of FIG. 4 the bracing member 15 and pivot arm 13 move as illustrated to the position of FIG. 4 where a pin mechanism 19 can be secured to lock the wings 3 in the field position. This motion will occur whether the final force FF is provided with a wing actuator 17 or by maneuvering the center section without a wing actuator as described above.

With the wings 3 extended as in FIG. 3, the force exerted by the wing actuator 17 is exerted on a significant lever arm L with respect to the wing pivot axis WA, such that the final force FF to pivot the wing 3 about the wing axis WA is reduced. In addition the wing 3 may be rolling forward along the ground, and so less force is required than would be required to start the wing 3 from a stopped position.

By steering the wing wheels 9 while moving forward, the wings 3 move outward and forward toward the field position on their own, without the need to provide a mechanism with sufficient power to force the wings forward. Thus the apparatus and method allows for transporting an implement where the rear folding wings 3 have considerable size and mass without providing a costly and cumbersome mechanism for moving the wings from transport to field position.

To move from the field to transport position, the bracing members 15 are released and the implement apparatus 1 is moved forward while pivoting the wheels 9 back to their transport position with the rotational planes thereof aligned with the wings 3 and the forward operating travel direction T.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus comprising:
a center section mounted on main wheels oriented to carry the center section in a forward operating travel direction;
right and left wings pivotally attached to corresponding right and left ends of the center section about substantially vertical wing pivot axes;
right and left wing wheels mounted at outer locations on the corresponding right and left wings operative to support the wings for travel in the operating travel direction;
wherein the wing wheels arc pivotally mounted to the wings about substantially vertical right and left wheel axes;
wherein the wings can pivot from a transport position, where the wings extend rearward from ends of the center section and are oriented substantially in alignment with the operating travel direction and where a rotational plane of each wing wheel is substantially aligned with the corresponding wing section and with the operating travel direction, to a field position where the wings extend substantially perpendicular from ends of the center section and where the rotational plane of each wing wheel is substantially perpendicular to the wing and aligned with the operating travel direction;
a right wheel actuator operative to pivot the right wing wheel from the transport position to the field position as the apparatus moves in the operating travel direction by pivoting the right wheel about the right wheel axis such that a front edge of the right wing wheel moves to the right; and
a left wheel actuator operative to pivot the left wing wheel from the transport position to the field position as the apparatus moves in the operating travel direction by pivoting the left wing wheel about the left wheel axis such that a front edge of the left wing wheel moves to the left.

2. The apparatus of claim 1 further comprising at least one wing actuator operative to exert a forward force on the wings.

3. The apparatus of claim 2 comprising releasable fasteners operative to maintain the wings in the field position.

4. A method of operating an agricultural implement, the method comprising:
providing an agricultural implement including:
a center section mounted on main wheels oriented to carry the center section in a forward operating travel direction;
right and left wings pivotally attached to corresponding right and left ends of the center section about substantially vertical wing pivot axes;
right and left wing wheels mounted at outer locations on the corresponding right and left wings operative to support the wings for travel in the operating travel direction;
wherein the wing wheels are pivotally mounted to the wings about substantially vertical right and left wheel axes; and
right and left wheel actuators operative to pivot the right and left wing wheels about their respective wheel axes;
orienting the wings in a transport position where the wings extend rearward from ends of the center section and are oriented substantially in alignment with the operating travel direction, and where a rotational plane of each wing wheel is substantially aligned with the corresponding wing section and with the operating travel direction:
with a vehicle connected to the center section, moving the implement to a field location;
moving the implement in the operating travel direction while operating the right wheel actuator to move a front edge of the right wing wheel to the right and operating the left wheel actuator to move a front edge of the left wing wheel to the left such that the wings move outward to an intermediate position where the wings extend laterally from ends of the center section;
operating the right wheel actuator to move a front edge of the right wing wheel to the right and operating the left wheel actuator to move a front edge of the left wing wheel to the left such that rotational planes of the right and left wing wheels are substantially perpendicular to the corresponding right and left wings;
exerting a final force on the wings relative to the center section to move the wings to a field position where the wings extend substantially perpendicular from ends of the center section and where the rotational plane of each wing wheel is substantially aligned with the operating travel direction; and
securing the wings in the field position.

5. The method of claim 4 comprising exerting the final force on the wings by stopping forward movement of the center section.

6. The method of claim 4 comprising exerting the final force on the wings by moving the center section rearward.

7. The method of claim 4 comprising providing wing actuators operative to pull the wings forward and exerting the t1nal force on the wings by operating the wing actuators.

8. The method of claim 4 comprising:
moving the implement from the field position to the transport position by;
releasing the wings;
operating the right wheel actuator to move the front edge of the right wing wheel to the left and operating the left wheel actuator to move the front edge of the left wing wheel to the right such that rotational axes of the right and left wing wheels are substantially aligned with the corresponding right and left wings;
moving the center section in the forward operating travel direction.

* * * * *